(12) United States Patent
Thomson

(10) Patent No.: US 8,406,122 B2
(45) Date of Patent: Mar. 26, 2013

(54) FAULT REPORTING TAG FOR MESH ACCESS POINTS

(75) Inventor: Allan Thomson, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 266 days.

(21) Appl. No.: 12/884,615

(22) Filed: Sep. 17, 2010

(65) Prior Publication Data

US 2011/0007636 A1    Jan. 13, 2011

Related U.S. Application Data

(63) Continuation of application No. 11/689,167, filed on Mar. 21, 2007, now Pat. No. 7,843,807.

(51) Int. Cl.
*G01R 31/08* (2006.01)
*G06F 11/00* (2006.01)

(52) U.S. Cl. ............... 370/217; 370/242; 714/2; 714/30

(58) Field of Classification Search .......... 370/216–220, 370/225, 228, 241, 242, 245; 714/100, 1, 714/2, 25, 27, 30, 31, 43, 45, 48; 702/108
See application file for complete search history.

(56) References Cited

U.S. PATENT DOCUMENTS

| 7,558,192 B1 | 7/2009 | Truong et al. |
| 2005/0242925 A1 | 11/2005 | Zaretsky et al. |
| 2007/0138251 A1* | 6/2007 | Mattlin et al. ............... 235/375 |
| 2008/0137624 A1 | 6/2008 | Silverstrim et al. |
| 2008/0140479 A1 | 6/2008 | Mello et al. |

OTHER PUBLICATIONS

Shen, Lu, et al., "Signaling schemes for distributed connection management in wavelength-routed optical mesh networks," Department of Computer Science and Engineering, University of Nebraska-Lincoln, http://rcf.unl.edu/netgroup/pubs/ShYR-ONM04.pdf.
Ramachandran, Krishna N., et al., "A Framework for the Management of Large-Scale Wireless Network Testbeds,", Department of Computer Science, University of California, Santa Barbara, California, http://imj.gatech.edu/papersWINMEE-05.pdf.gz.

* cited by examiner

*Primary Examiner* — Kerri Rose
(74) *Attorney, Agent, or Firm* — Baker Botts L.L.P.

(57) ABSTRACT

Mesh access point fault reporting. In particular implementations, a method includes receiving a fault indication indicating one or more failures; collecting fault data related to the one or more failures or a state of the mesh access point; and passing the fault data to the RFID tag, which wirelessly transmits messages relating to the fault.

20 Claims, 6 Drawing Sheets

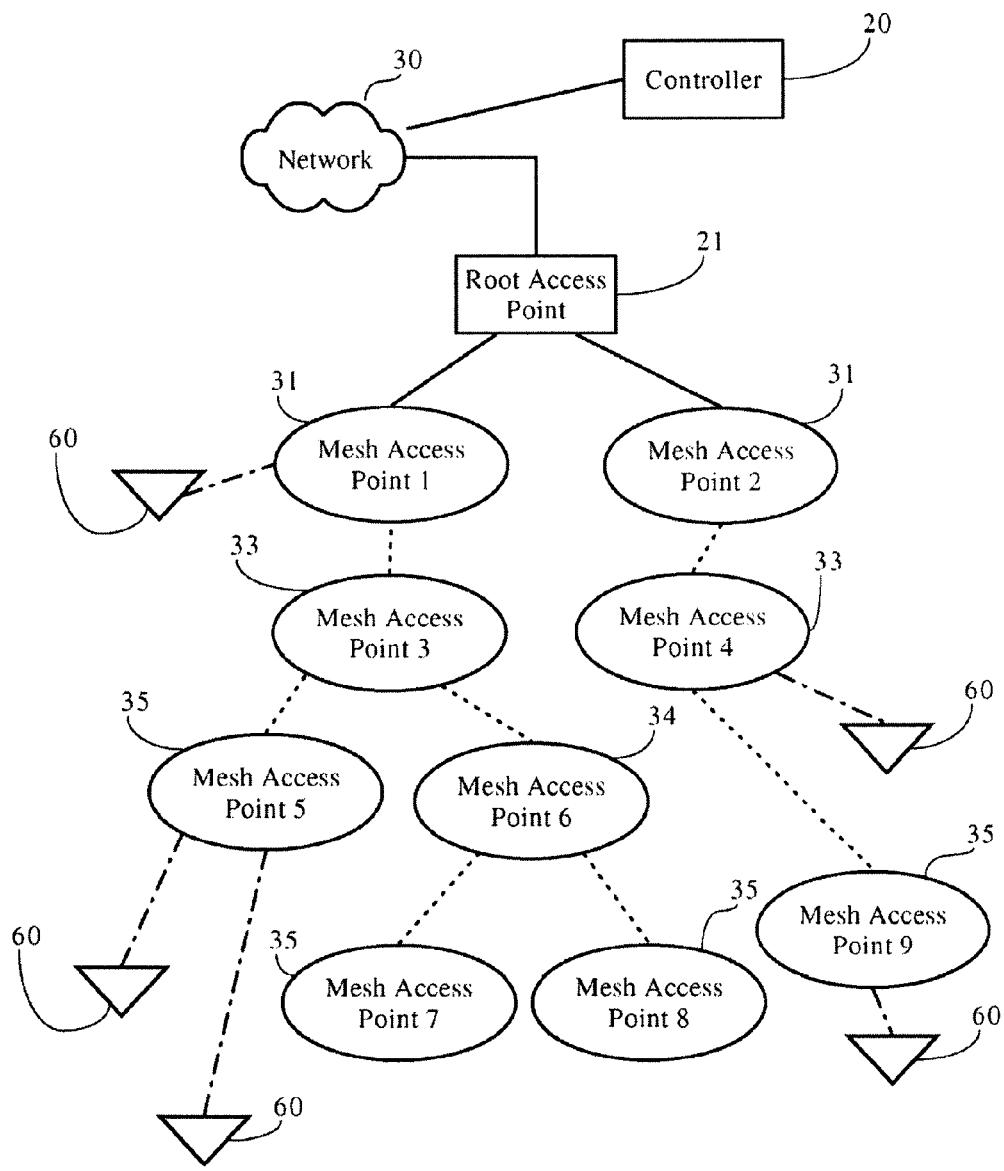
Fig._1

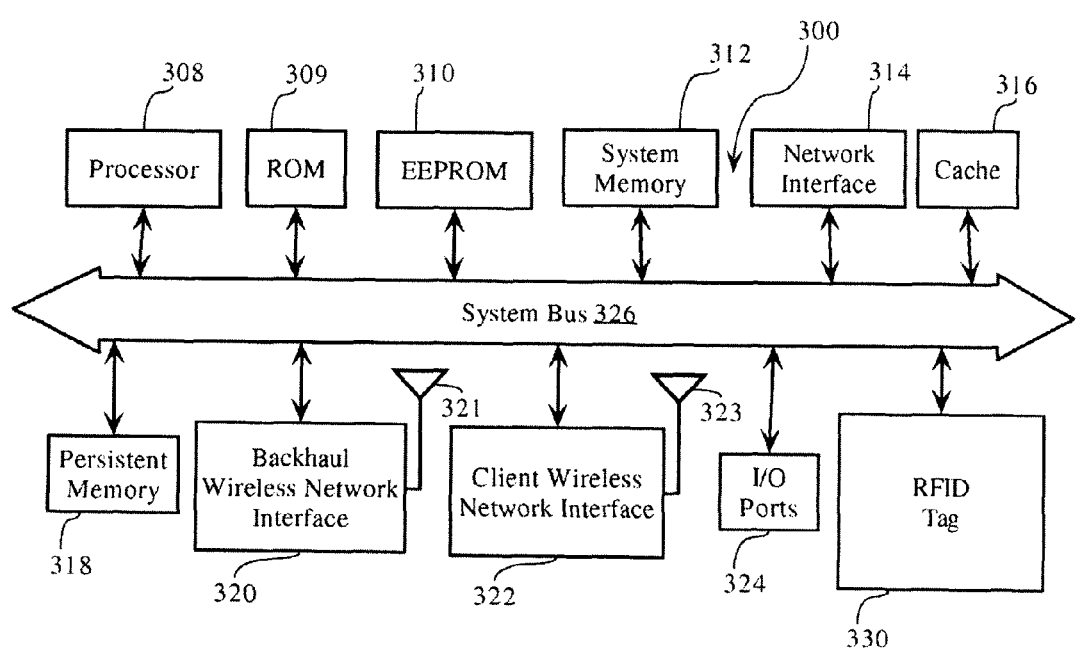
Fig._2

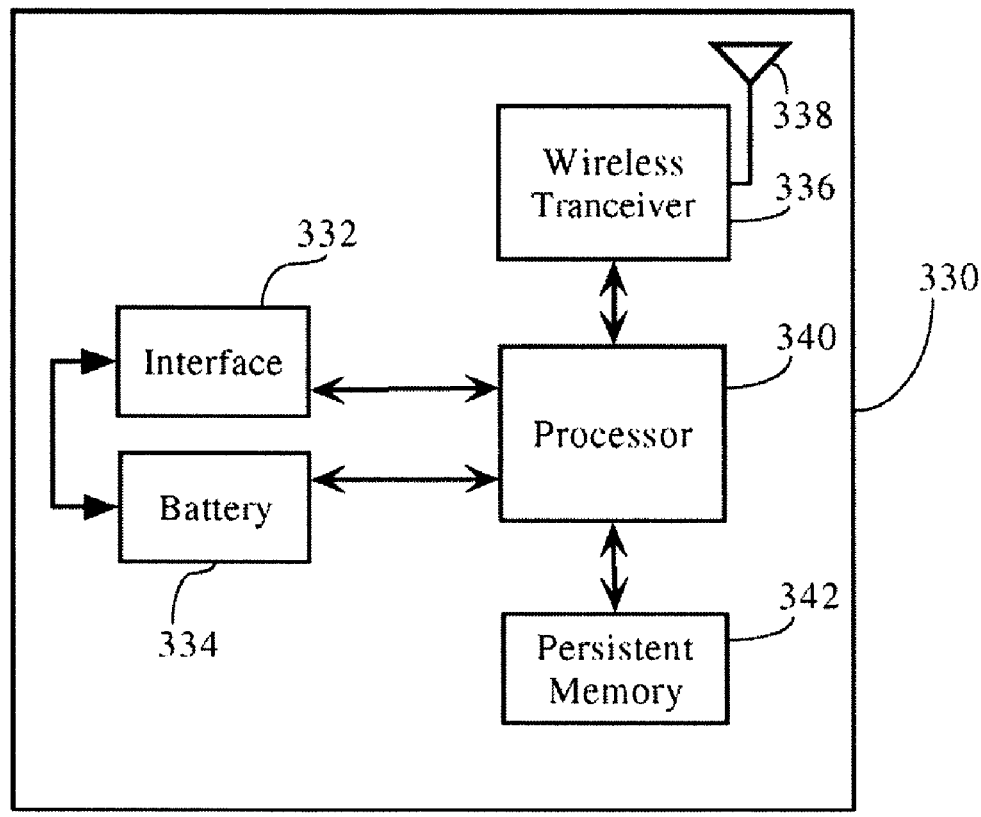
Fig._3

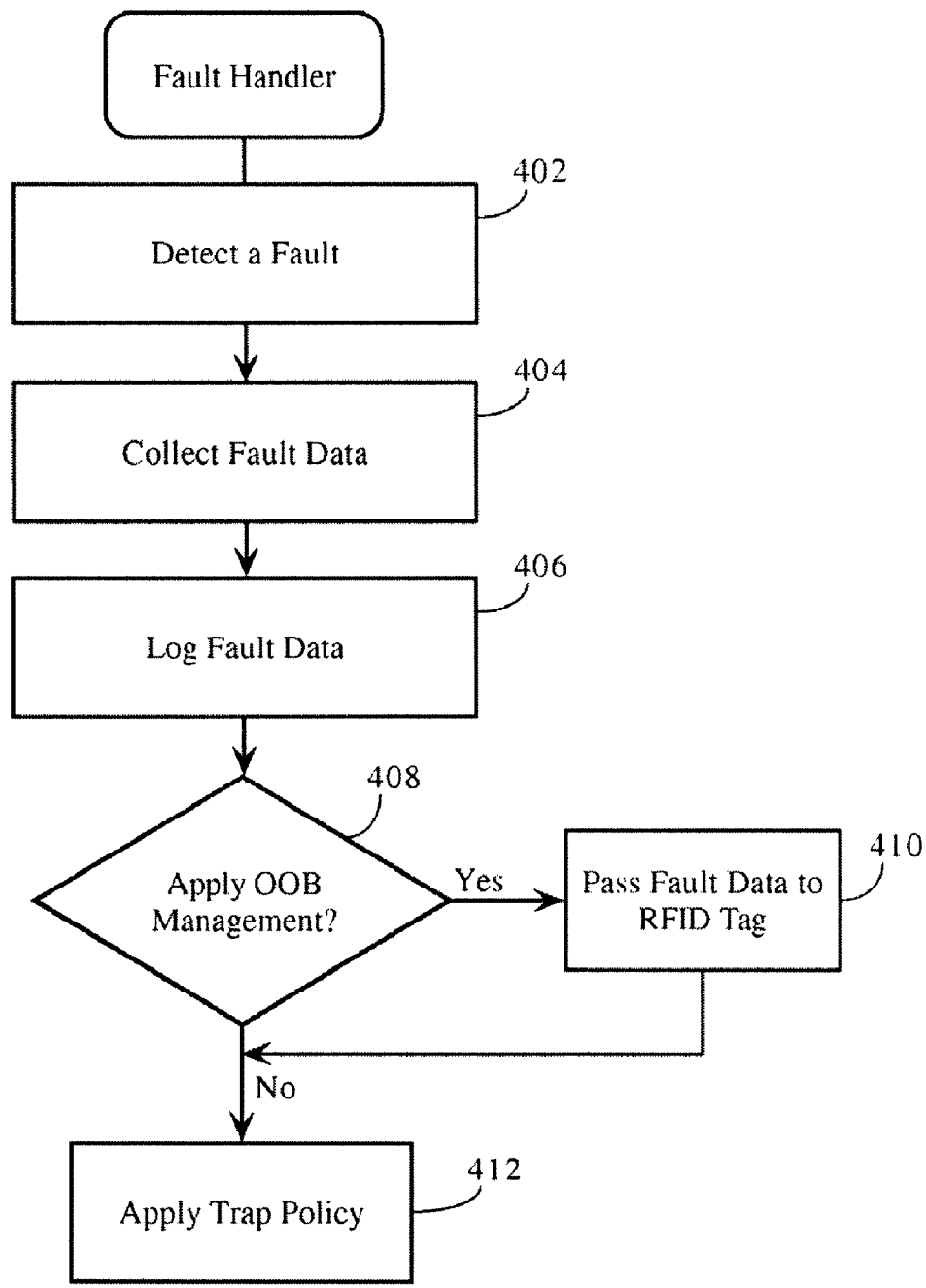
Fig._4

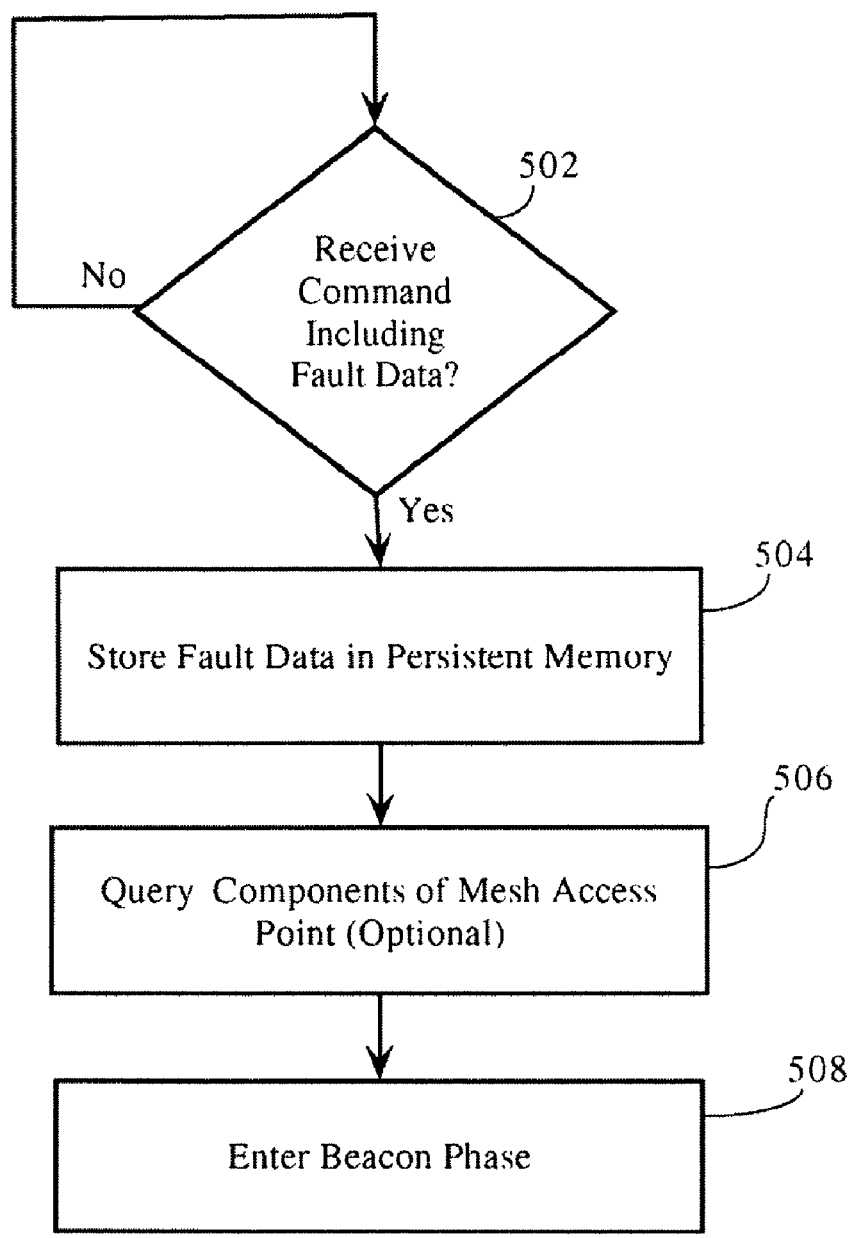
Fig._5

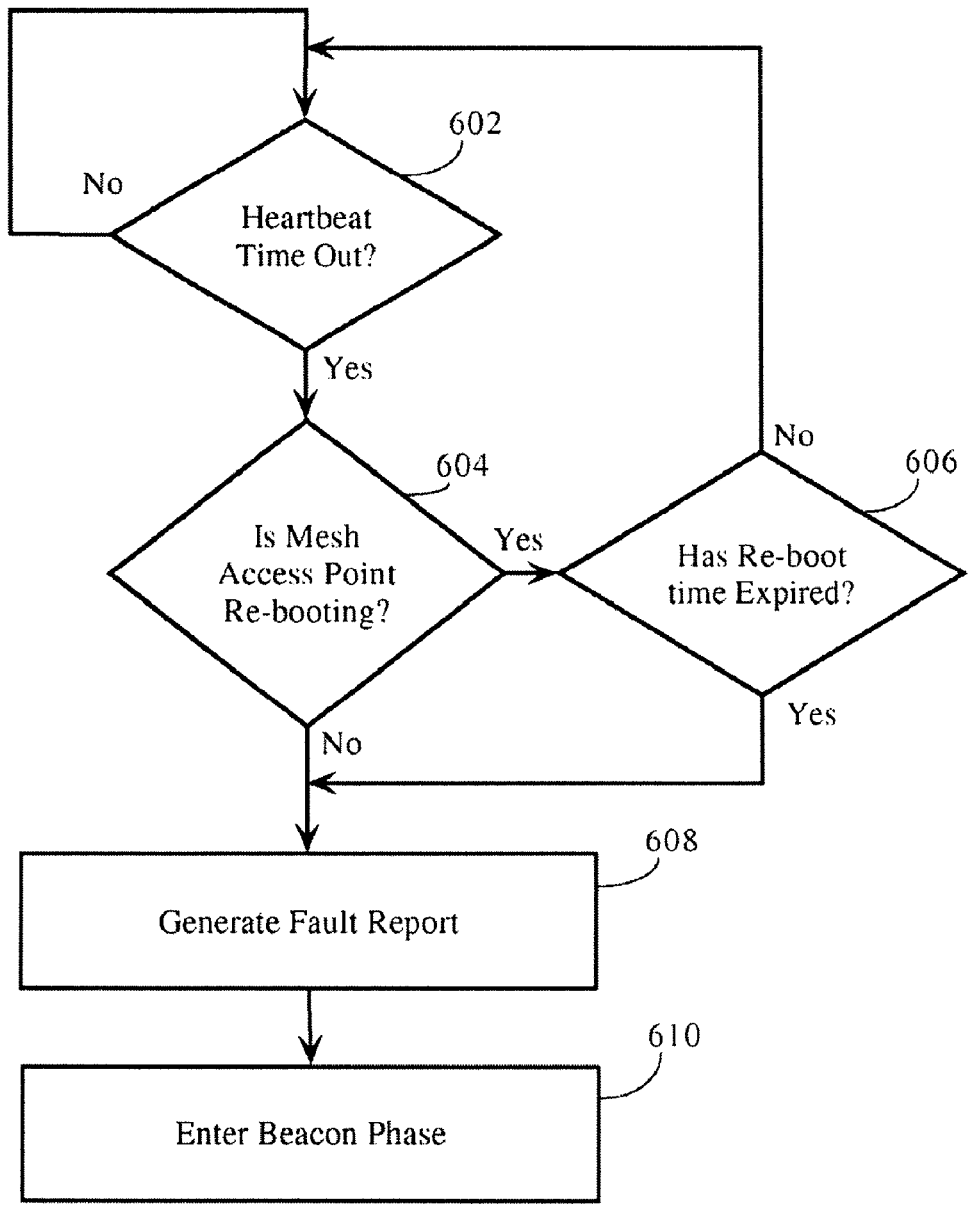
Fig._6

FAULT REPORTING TAG FOR MESH ACCESS POINTS

CROSS REFERENCE TO RELATED APPLICATION

This application is a continuation of U.S. application Ser. No. 11/689,167 filed Mar. 21, 2007 and entitled "Fault Reporting Tag for Mesh Access Points".

TECHNICAL FIELD

This disclosure relates generally to wireless mesh networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

Managing mesh access points can be particularly challenging due to the remote distribution of the mesh access points. It is typically very costly to debug problems associated with a given mesh access point if it becomes isolated from a given network, especially if the problems may have occurred on the mesh access point and an administrator needs to travel physically to the remote site to troubleshoot the problems. Typically, if a mesh access point that experiences problems is identified and located, the administrator may use a serial interface or other alternate interface at the mesh access point to troubleshoot the problems if the administrator has physical access to the device.

DESCRIPTION OF THE DRAWINGS

FIG. 1 illustrates an example topological diagram of a hierarchical wireless mesh network.

FIG. 2 illustrates an example hardware system, which may be used to implement a mesh access point.

FIG. 3 illustrates an example hardware system, which may be used to implement a radio frequency identification (RFID) tag.

FIG. 4 illustrates an example method implemented at a mesh access point.

FIG. 5 illustrates an example method implemented at an RFID tag in accordance with one implementation.

FIG. 6 illustrates an example method implemented at an RFID tag in accordance with another implementation.

DESCRIPTION OF EXAMPLE EMBODIMENTS

A. Overview

Particular implementations facilitate fault reporting in wireless mesh networks. According to one implementation, a mesh access point includes an RFID tag that provides for out-of-band reporting of faults when the mesh access point itself may not be able to communicate over the wireless network. As described in more detail below, the mesh access point includes a mesh access point module that interacts with the RFID tag. For example, the mesh access point module passes identification and configuration information to the RFID tag when the mesh access point initializes and when the mesh access point detects errors (e.g., connectivity problems) while operating in an access point mode in a wireless mesh network. In one implementation, the mesh access point module is operable to pass state information to the RFID tag, and potentially other information, that may be useful for trouble shooting. In one implementation, if the mesh access point experiences a power failure, the RFID tag may detect the power failure and may generate a fault report based on any information that the RFID tag may have collected up until the power failure. As such, the RFID tag may generate a fault report based on identification information, configuration information, and other information provided to it, and broadcast fault report messages that may be received by other nodes of the wireless mesh network and forwarded to a controller or network management server.

B. Example Wireless Mesh Network System Architecture

B.1. Network Topology

FIG. 1 illustrates a wireless mesh network according to one implementation of the present invention. In one implementation, the wireless mesh network includes a wireless mesh controller 20, a root access point 21, and a plurality of child wireless mesh access points. In one implementation, the mesh access points are logically arranged in a hierarchy for purposes of routing traffic to the root access point (RAP), and on to a network. In one implementation, this hierarchy can be dynamically configured and shifted based on discovery of wireless management messages between wireless mesh access points, or statically configured.

In one implementation, a hierarchical architectural overlay is imposed on the mesh network of routing nodes to create a downstream direction towards leaf routing nodes 35, and an upstream direction toward the root access point 21. For example, in the hierarchical mesh network illustrated in FIG. 1, first hop mesh access point 31 is the parent of intermediate mesh access point 33. In addition, intermediate mesh access points 33 and 34 are the parent to leaf mesh access point 35. In one implementation, this hierarchical relationship is used in routing packets between wireless clients 60, or between wireless clients 60 and network 30. Of course, a variety of wireless mesh network configurations are possible, including non-hierarchical configurations, and hierarchical configurations with fewer or greater number of hierarchical tree structures.

The mesh access points in the mesh network, in one implementation, generally include one radio, operating in a first frequency band, and associated wireless communication functionality to communicate with other mesh access points to thereby implement the wireless backbone, as discussed more fully below. All or a subset of the mesh access points, in one implementation, also include an additional radio, operating in a second, non-interfering frequency band, and other wireless communication functionality to establish and maintain wireless connections with mobile stations, such as wireless client 60. For example, in 802.11 wireless networks, the backbone radios on the wireless routing nodes may transmit wireless packets between each other using the 802.11a protocol on the 5 GHz band, while the second radio on each mesh access point may interact with wireless clients on the 2.4 GHz band (802.11b/g). Of course, this relation can also be reversed with backhaul traffic using the 802.11b/g frequency band, and client traffic using the 802.11a band. In addition, the mesh access points may include only a single radio or additional radios.

In one implementation, some wireless mesh networks can include a controller and a plurality of mesh access points that are configured into one or more routing and control hierarchies based on automatic neighbor and route discovery protocols. In some environments, individual mesh access points automatically discover their neighbors and configure hierarchical routing configurations by selecting parent nodes based on a variety of factors. Mesh access points, in some systems, connect to a wireless controller through one or more parents nodes in the routing hierarchy.

B.2. Wireless Mesh Access Point

FIG. 2 illustrates for didactic purposes a hardware system, which may be used to implement a wireless mesh access point in a wireless mesh network. In one implementation, the wireless mesh access point 300 comprises a processor 308, a read-only memory (ROM) 309, and an electronically erasable read-only memory (EEPROM) 310. The wireless mesh access point 300 may also include one or more of the following: a memory 312, a network interface 314 (e.g., an 802.3 interface) for communication with a LAN, a cache 316 for storing WLAN information, and a persistent memory 318. The wireless mesh access point 300 may also include a backhaul wireless network interface 320 having an antenna 321. Backhaul wireless network interface 320 is configured to transmit and receive messages to/from one or more other wireless mesh access points in a mesh network. The wireless mesh access point 300 may also include a client wireless network interface 322 (e.g., an IEEE 802.11 WLAN interface) having an antenna 323. Client wireless network interface 322 is configured for wireless communication with one or more wireless clients 60. The backhaul wireless network interface 320 and client wireless network interface 322 may be radio interfaces. The wireless mesh access point 300 may also include input/output (I/O) ports 324 and a system bus 326 interconnecting these components. As FIG. 2 also illustrates, mesh access point also includes a RFID tag 330. In one implementation, RFID tag 330 is operably connected to system bus 326 using any suitable interface (e.g., a RS-232 serial interface, pulse code modulation interface (PCMI), FireWire interface, universal serial bus (USB) interface).

In some implementations, wireless mesh access point use one or more of the following standards: WiFi/802.11, WiMax/802.16, 2G, 3G, or 4G Wireless, Bluetooth/802.15, Zigbee, or any other suitable wireless communication standards. In one implementation, wireless mesh access point may have a separate access radio, and associated interface components, for communicating with a wireless client or other portable computer. The wireless mesh access points may also include software modules, including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, one or more of these software components are loaded into system memory 312 and then accessed and executed by processor 310. In one implementation, the wireless mesh access point 300 includes software or firmware modules for recognizing the reception of network management information and for storing such information in memory (e.g., EEPROM 310). In a particular implementation, a mesh access point module is a firmware or software module including computer-readable instructions operative to cause the processor and other components to perform the functions described herein. In the implementations described herein, the mesh access point module is also operative to communicate with RFID module 330 to pass fault report data, commands, and/or heartbeat messages over system bus 326.

B.3. RFID Tag

FIG. 3 illustrates an example hardware system, which may be used to implement an RFID tag 330 of FIG. 1. In one embodiment, the RFID tag 330 includes an interface 332 for communicating on the system bus of the mesh access point, a battery 334 or other external power source separate from the mesh access point, a wireless transceiver 336 with an antennae 338, a processor 340, and a persistent memory 342 such as a flash memory coupled to each other as shown. In one implementation, wireless transceiver 336 provides communication between hardware system 400 and any of a wide range of wireless networks, such as a WLAN (i.e., IEEE 802.11), WiMax (i.e., IEEE 802.16), Cellular (e.g., GSMA), etc. Persistent memory 342 provides permanent storage for data and programming instructions to perform the above-described functions implemented by processor 340.

As described in more detail below, the RFID tag 330 stores identification and configuration information associated with the mesh access point 300 when the mesh access point initializes and when the mesh access point detects errors (e.g., connectivity problems) when communicating with the wireless network. In one implementation, the RFID tag 330 is operable to generate fault reports and broadcast fault report messages.

C. Communication Between the Mesh Access Point and the RFID Tag

As described in more detail below, the mesh access point module of the mesh access point 300 may send identification and configuration information to the RFID tag 330 upon initialization. Furthermore, the RFID tag 330 may receive error log information from the mesh access point module of mesh access point 300 during normal operation. Upon detection of a communication failure, or other critical error or failure condition, by either the mesh access point 300 (when it has power or is otherwise able) or by the RFID tag 330, the RFID tag 330 may generate a fault report including available identification, configuration and/or fault information and broadcast the fault report information in fault report messages using wireless transceiver 336

In one implementation, during initialization/power-up of the mesh access point 300, the mesh access point 300 discovers the RFID tag 330 and sends identification information (e.g., Media Access Control address, serial number, product types, model number, etc.) and configuration information (e.g., software version, operating parameters, etc.) to the RFID tag 330. The RFID tag 330 may then store the identification and configuration information to a persistent memory (e.g., flash memory).

Furthermore, the RFID tag 330, in some particular implementations, may be triggered to transmit fault report messages in response to explicit commands from mesh access point 300 or to detected failures of the mesh access point 300.

C.1. Failure Detection by the Mesh Access Point

FIG. 4 illustrates an example method implemented at a mesh access point. The process begins when the mesh access point 300 detects a fault (402). In one implementation, the fault may relate to a communication problem with a wireless network interface of mesh access point 300. The mesh access point module collects fault data (404) and then logs the fault data (406). In one implementation, the fault data may include information describing the nature of the problem (e.g., no communication at all, authentication failure, etc.). The mesh access point module then determines whether to apply out-of-band (OOB) management (408). In one implementation, this determination may be based on one or more policies. For example, if the fault data indicates that the performance of the mesh access point 300 is degraded, but the mesh access point 300 can still communicate with the wireless network, the mesh access point module may apply in-band management and communicate directly over the wireless network. If the fault data indicates that the mesh access point 300 cannot communicate with the wireless network, the mesh access point module may utilize the RFID tag 330 to broadcast a fault report message. In some instances, however, the access point module may opt to transmit fault report data to the RFID tag 330 and attempt in-band communications using wireless network interface 320 and/or 322. As such, if the mesh access point module applies OOB management, the mesh access point module passes the fault data to the RFID tag 330 (410). The operations of the RFID tag 330 are described in more detail below in connection with FIGS. 5 and 6. As FIG. 4 illustrates, the mesh access point module may also apply a trap policy (412). For example, the mesh access point module may attempt to send an in-band notification to the wireless network infrastructure indicating any problems. Transmitting a trap (e.g., an SNMP trap) may be controlled by one or more policies.

C.2. RFID Process with Explicit Command Fault Reporting

The following example process can be implemented when the mesh access point 300 loses communication with the wireless network due to communication errors or failures, but where the mesh access point 300 still has power and its software or firmware modules are still capable of execution.

FIG. 5 illustrates an example method implemented at an RFID tag in accordance with one particular implementation of the invention. As FIG. 5 shows, the RFID tag 330 determines if it has received, from access point module, a command including fault data (502). If the RFID tag 330 received a command including fault data, the RFID tag 330 stores the fault data in persistent memory (504). The RFID tag 330 may optionally query one or more components of the mesh access point 300 to possibly gather additional information (506). Such information may include state information, status information, or any other physical environment and parameter information (e.g., antenna orientation, device or component status information, global positioning system (GPS) position information, etc.) that may be useful for troubleshooting the mesh access point 300.

The RFID tag 330 then enters a beacon phase (508). During the beacon phase the RFID tag 330, in one implementation, broadcasts 802.11 multicast frames with one or more aspects of identification data, configuration data, or fault data. In one implementation, the RFID tag 330 transmits the multicast frames on one to a plurality of frequency channels preconfigured on the RFID tag 330. In one implementation, the RFID tag 330 may transmit the multicast frames on all available operating channels within a given band to better ensure that neighboring mesh access points (or other wireless nodes) detect the fault report messages. The transmitted fault report messages may be detected by one or more neighboring mesh access points, which may be configured to automatically forward received fault report messages to an appropriate wireless network infrastructure node (e.g., backhaul controller, network management system, etc.) for processing (e.g., notification and troubleshooting).

In some implementations, the mesh access point 300 may have a certificate for mesh access point authentication, and may also send the certificate to the RFID tag 330 upon initialization. As such, the RFID tag 330 may include the certificate or information in the certificate to digitally sign, and/or encrypt, the fault report message to allow the fault message to be authenticated.

C.3. RFID Process Responsive to Access Point Failure

The following process is associated with scenarios where the mesh access point 300 fails due to power loss, or a problem with software, firmware and/or hardware. Because the RFID tag 330 is separately powered by a battery, the RFID tag 330 may still operate to detect a failure of the mesh access point 300 due to power loss (or some other problem where the mesh access point 300 is failing to respond over the internal hardware interface with the RFID tag 330). The RFID tag 330 can also perform other functions as described below in connection with FIG. 6.

FIG. 6 illustrates an example method implemented at an RFID tag in accordance with a particular implementation of the invention. In the implementation described below, RFID tag 330 uses heartbeat messages to detect the operational presence of the access point 300. That is, in one implementation, the access point module is configured to transmit messages to RFID tag 330 on a periodic basis. In other implementations, the RFID tag 330 is operative to transmit messages to access point module, which responds to the messages. A failure to detect such heartbeat messages may cause RFID tag to enter a beacon phase and transmit fault reporting messages.

In a particular implementation, as FIG. 6 shows, the RFID tag 330 determines if an expected heartbeat message from mesh access point module has timed out (602). In one implementation, the RFID tag 330 wakes up periodically to sense whether the mesh access point module of mesh access point 300 is still operational. For example, in one implementation, RFID tag 330 may wake up and transmit a keep-alive message to mesh access point module. If a response times out, the RFID tag 330 optionally determines whether the mesh access point 300 is re-booting (604). In one implementation, the mesh access point module is configured to notify RFID tag 330 any time it re-boots. If so, the RFID tag 330 determines if a reboot time has expired (606). If the reboot time has expired, the RFID tag 330 then generates a fault report (608). The RFID tag 330 then enters a beacon phase (610). In one implementation, the beacon phase is similar to the beacon phase described above in FIG. 5, where the RFID tag 330 broadcasts 802.11 multicast frames including fault report data including one or more aspects of identification data, configuration data, and fault data.

After the appropriate wireless network infrastructure node (e.g., backhaul controller, network management system, etc.) receives the fault report, the wireless network infrastructure node may perform one or more operations, such as notifying a network administrator and/or attempting to transmit messages to the RFID tag 330. For example, in one implementation, a network management server may communicate with the RFID tag 330 to attempt one or more troubleshooting operations. In one implementation, if appropriate, the network management server may determine that the mesh access point 300 requires new security information, and may attempt to reconfigure the mesh access point 300 (e.g., change particular security settings) by communicating one or more security settings through the RFID tag 330 to the mesh access point 300. In some implementations, the network management server may notify an appropriate network administrator and include one or more attributes of the fault report message.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. An access point comprising:
one or more processors;
a memory;
a wireless network interface;
a radio-frequency identification (RFID) tag; and an access point module, physically stored in the memory, comprising instructions operative to cause the one or more processors to:
  receive a fault indication indicating one or more failures;
  collect fault data related to the one or more failures or a state of the access point; and
  pass the fault data to the RFID tag;
wherein the RFID tag is operative to:
  autonomously detect a failure of the access point module or the access point; and
  automatically in response to the detected failure, wirelessly broadcast one or more fault report messages on one or more radio frequency channels.

2. An access point comprising:
one or more processors;
a memory;
a wireless network interface;
a radio-frequency identification (RFID) tag; and
an access point module, physically stored in the memory, comprising instructions operative to cause the one or more processors to:
  receive a fault indication indicating one or more failures;
  collect fault data related to the one or more failures or a state of the access point; and
  pass the fault data to the RFID tag;
wherein the RFID tag is operative to:
  detect a failure of the access point module or the access point; and
  automatically in response to the detected failure, wirelessly broadcast one or more fault report messages on one or more radio frequency channels;
wherein the access point module further comprises instructions operative to cause the one or more processors to:
  determine, in response to the fault indication, whether the access point can communicate with a wireless network,
  transmit an in-band fault reporting message over the wireless network via the wireless network interface, if the access point can communicate with the wireless network;
  utilize the RFID tag, if the access point can not communicate with the wireless network.

3. The access point of claim 2 wherein the in-band fault reporting message is a Simple Network Management Protocol (SNMP) trap.

4. The access point of claim 1 wherein the one or more fault report messages transmitted by the RFID tag are transmitted as multicast frames.

5. The access point of claim 1 wherein the access point module further comprises instructions operative to cause the one or more processors to:
  forward fault reporting messages received from RFID tags of other access points to a wireless network management node for processing.

6. The access point of claim 1 wherein the RFID tag is operative to digitally sign the one or more fault reporting messages with a digital certificate of the access point.

7. The access point of claim 1 wherein the RFID tag is operative to encrypt the one or more fault reporting messages.

8. The access point of claim 1 wherein the access point module is operative to pass configuration information to the RFID tag.

9. The access point of claim 1 wherein the access point module is operative to pass identification information to the RFID tag.

10. The access point of claim 1 wherein the fault report messages comprises one or more aspects of identification data, configuration data, and fault data.

11. The access point of claim 1 wherein the RFID tag is operative to store the fault data in a persistent memory.

12. The access point of claim 1 wherein the RFID tag is operative to query one or more components of the wireless access point for state information.

13. A method comprising:
  detecting, at an access point, a fault indication indicating one or more failures on the access point;
  collecting, by the access point, fault data related to the one or more failures or a state of the access point; and
  passing the fault data to an RFID tag connected to the access point;
wherein the RFID tag is operative to:
  autonomously detect a failure of the access point; and
  automatically in response to the detected failure, wirelessly broadcast one or more fault report messages on one or more radio frequency channels.

14. A method comprising:
  detecting, at an access point, a fault indication indicating one or more failures on the access point;
  collecting, by the access point, fault data related to the one or more failures or a state of the access point;
  passing the fault data to an RFID tag connected to the access point;
wherein the RFID tag is operative to:
  detect a failure of the access point; and
  automatically in response to the detected failure, wirelessly broadcast one or more fault report messages on one or more radio frequency channels; and
  determining by the access point, in response to the fault indication, whether the access point can communicate with a wireless network,
  transmitting an in-band fault reporting message over the wireless network via a wireless network interface of the access point, if the access point can communicate with the wireless network; and
  utilizing by the access point the RFID tag, if the access point can not communicate with the wireless network.

15. The method of claim 13 further comprising
  forwarding, by the access point, fault reporting messages received from RFID tags of other access points to a wireless network management node for processing.

16. The method of claim 13 further comprising digitally signing, by the RFID tag, the one or more fault reporting messages with a digital certificate of the access point.

17. The method of claim 13 further comprising, storing, by the RFID tag, the fault data in a persistent memory.

18. The method of claim 13 further comprising, querying, by the RFID tag one or more components of the wireless access point for state information.

19. The method of claim 13 wherein the one or more fault report messages transmitted by the RFID tag are transmitted as multicast frames.

20. The method of claim 13 further comprising passing identification information of the access point from the access point to the RFID tag.

* * * * *